(12) United States Patent
Shao et al.

(10) Patent No.: US 10,594,477 B2
(45) Date of Patent: Mar. 17, 2020

(54) BLOCKCHAIN SMART CONTRACT UPDATES USING DECENTRALIZED DECISION

(71) Applicant: Alibaba Group Holding Limited, George Town (KY)

(72) Inventors: Kailai Shao, Hangzhou (CN); Xuming Lu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,776

(22) Filed: Apr. 22, 2019

(65) Prior Publication Data

US 2019/0253239 A1  Aug. 15, 2019

Related U.S. Application Data

(63) Continuation of application No. PCT/CN2018/118543, filed on Nov. 30, 2018.

(51) Int. Cl.
*H04L 29/06* (2006.01)
*H04L 9/06* (2006.01)
(Continued)

(52) U.S. Cl.
CPC .......... *H04L 9/0637* (2013.01); *G06Q 10/10* (2013.01); *G06Q 50/188* (2013.01); *H04L 9/0891* (2013.01); *H04L 9/3239* (2013.01); *H04L 9/3247* (2013.01); *H04L 9/3297* (2013.01); *H04L 2209/38* (2013.01); *H04L 2209/463* (2013.01); *H04L 2209/56* (2013.01)

(58) Field of Classification Search
CPC .............................. H04L 9/3247; H04L 9/0637

USPC ........................................................ 713/168
See application file for complete search history.

(56) References Cited

U.S. PATENT DOCUMENTS 10,318,979 B2 * 6/2019 Frank ................. G06Q 30/0217
10,346,406 B2 * 7/2019 Booz ................. G06F 16/24568
(Continued)

FOREIGN PATENT DOCUMENTS

| CN | 108833398 | 11/2018 |
|----|-----------|---------|
| WO | WO 2018006072 | 1/2018 |
| WO | WO 2018149504 | 8/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Longbit Chai
(74) *Attorney, Agent, or Firm* — Fish & Richardson P.C.

(57) ABSTRACT

Implementations of the present disclosure include receiving, by a contract updates management system, an update request indicating a change to a smart contract, the change being a proposed update to the smart contract, determining, by executing an updates smart contract within the contract updates management system, whether conditions are met for updating the smart contract to incorporate the change, the updates smart contract defining the conditions, and upon determining, by the contract updates management system, that the conditions are met, updating, by the contract updates management system, the smart contract, and recording the change to one or more blocks in a blockchain of a blockchain network.

20 Claims, 4 Drawing Sheets

(51) Int. Cl.
*G06Q 50/18* (2012.01)
*H04L 9/32* (2006.01)
*G06Q 10/10* (2012.01)
*H04L 9/08* (2006.01)

(56) References Cited

U.S. PATENT DOCUMENTS

| | | |
|---|---|---|
| 2013/0007849 A1 | 1/2013 | Coulter et al. |
| 2018/0096360 A1* | 4/2018 | Christidis ............. H04L 9/3239 |
| 2018/0114205 A1 | 4/2018 | Thomas et al. |
| 2018/0129945 A1* | 5/2018 | Saxena ................. G06Q 20/02 |
| 2018/0181979 A1 | 6/2018 | Frank et al. |
| 2018/0343175 A1 | 11/2018 | Bathen et al. |

OTHER PUBLICATIONS

Nakamoto, "Bitcoin: A Peer-to-Peer Electronic Cash System," www.bitcoin.org, 2005, 9 pages.

Extended European Search Report in European Application No. 18865359.6, dated Oct. 7, 2019, 9 pages.

PCT International Search Report and Written Opinion in International Application No. PCT/CN2018/118543, dated Sep. 2, 2019, 7 pages.

\* cited by examiner

BLOCKCHAIN SMART CONTRACT UPDATES USING DECENTRALIZED DECISION

CROSS-REFERENCE TO RELATED APPLICATIONS

This application is a continuation of PCT Application No. PCT/CN2018/118543, filed on Nov. 30, 2018, which is hereby incorporated by reference in its entirety.

BACKGROUND

Distributed ledger systems (DLSs), which can also be referred to as consensus networks and/or blockchain networks, enable participating entities to securely and immutably store data. DLSs are commonly referred to as blockchain networks without referencing any particular use case (e.g., crypto-currencies). Example types of blockchain networks can include public blockchain networks, private blockchain networks, and consortium blockchain networks. A public blockchain network is open for all entities to use, and participate in the consensus process. A private blockchain network is provided for a particular entity, which centrally controls read and write permissions. A consortium blockchain network is provided for a select group of entities, which control the consensus process, and includes an access control layer.

Smart contracts can be executed between entities, and reside within a blockchain network. In some instances, smart contracts need to be updated (e.g., to reflect changed circumstances between the entities). Conventional systems use centralized solution to manage changes to smart contracts, which can include processes that are difficult to manage, and have other disadvantages. For example, when a smart contract is to be updated (or upgraded), an authorized entity (e.g., a manager, a contract creator, or a public agency) may be responsible for updating a smart contract, and can communicate with entities regarding the update. After the communication reaches a consensus, the authorized entity can perform the update operation. This process can be difficult to monitor, and can require entities that are parties to the smart contract to trust the authorize entity.

SUMMARY

Implementations of the present disclosure include computer-implemented methods for updating smart contracts. More particularly, implementations of the present disclosure are directed to updating a smart contract by executing an updates smart contract within a contract updates management system.

In some implementations, actions include receiving, by a contract updates management system, an update request indicating a change to a smart contract, the change being a proposed update to the smart contract, determining, by executing an updates smart contract within the contract updates management system, whether conditions are met for updating the smart contract to incorporate the change, the updates smart contract defining the conditions, and upon determining, by the contract updates management system, that the conditions are met, updating, by the contract updates management system, the smart contract, and recording the change to one or more blocks in a blockchain of a blockchain network. Other implementations include corresponding systems, apparatus, and computer programs, configured to perform the actions of the methods, encoded on computer storage devices.

These and other implementations may each optionally include one or more of the following features: the update request includes an identifier assigned to the smart contract within the blockchain network; the update request includes an identifier assigned to the updates smart contract within the blockchain network; the smart contract includes: a controller contract defined by a dispatcher upon receipt of a request by a contract originator who originates the smart contract, a service contract that includes logic of the smart contract, and a data contract that includes terms of the smart contract; determining whether the conditions are met includes performing a voting process including: sending a request to one or more nodes in the blockchain network for a vote relative to the change, collecting votes from the one or more nodes, and determining that conditions are met when the collected votes indicate an approval of the change by the one or more nodes; performing the voting process includes weighting votes by weights associated with respective nodes, and wherein approval is based on a function of the collected votes and their associated weights; performing the voting process includes applying a veto received from a veto-privileged node, the voting process ending when a veto is received for the change during the voting process, the veto causing the change to be rejected; performing the voting process includes using voting rules specifying when the voting process is to result in approval of the change or rejection of the change; performing the voting process includes using a voting start time and a voting end time that define a voting period in which the voting process occurs; and performing the voting process ends and the conditions are met when a threshold number of voters have approved the change or when a combination of one or more specific voters have approved the change.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for updating smart contracts. More particularly, implementations of the present disclosure are directed to executing an updates smart contract within a contract updates management system to manage updates to smart contracts within a blockchain network. In some implementations, actions include receiving, by a contract updates management system, an update request indicating a change to a smart contract, the change being a proposed update to the smart contract, determining, by executing an updates smart contract within the contract updates management system, whether conditions are met for updating the smart contract to incorporate the change, the updates smart contract defining the conditions, and upon determining, by the contract updates management system, that the conditions are met, updating, by the contract updates management system, the smart contract, and recording the change to one or more blocks in a blockchain of a blockchain network.

To provide further context for implementations of the present disclosure, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate in a public blockchain network, each of which operates at least one node in the public blockchain network. Accordingly, the public blockchain network can be considered a public network with respect to the participating entities. In some examples, a majority of entities (nodes) must sign every block in order for the block to be valid and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., an enterprise). For example, a consortium of ten (10) entities (e.g., enterprises) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network, which is public among the participating entities (e.g., members of a consortium). It is contemplated, however, that implementations of the present disclosure can be realized in any appropriate type of blockchain network. Although techniques described in the present disclosure are indicated as being relevant to consortium blockchain networks, the techniques can also be used, with or without changes, in other types of blockchain networks, including public blockchain networks, and private blockchain networks.

Implementations of the present disclosure are described in further detail herein in view of the above context. More particularly, and as introduced above, implementations of the present disclosure are directed to executing an updates smart contract within a contract updates management system of a blockchain network to manage updates to smart contracts.

Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In some examples, a smart contract can store data, which can be used to record information, facts, associations, balances and any other information needed to implement logic for contract execution. Smart contracts can be described as a computer-executable program consisting of functions, where an instance of the smart contract can be created, and functions invoked for execution of the logic therein. In some examples, a smart contract can include various components, one or more of which can also be described as a contract. In some examples, one or more of the components of the smart contract can be updated as part of an update to the overall smart contract.

In some implementations, example components of a smart contract can include, without limitation, a controller contract, a service contract, and a data contract. The controller contract can be defined by a dispatcher upon receipt of a request by a contract originator, who originates the smart contract. Origination of the smart contract can include providing the smart contract to nodes in the consortium blockchain network (e.g., to the entities, who are to be parties to the smart contract). Origination of the smart contract can also identify a time, at which the smart contract was created, and an identification of the originator of the smart contract. In some examples, the service contract includes logic of the smart contract. The logic can define how the contract is executed, including a definition of an order of events and relationships to entities associated with the smart contract. The data contract includes terms of the smart contract, including, without limitation, products, and/ or services that are covered by the smart contract, and payment information for the smart contract for provision of the products, and/or services. Data that is stored in the data contract can be used to record information, facts, and associations including, without limitation, balances, payments, receipts, deliveries, deadlines, and any other information needed to implement logic of the smart contract.

In technical terms, smart contracts can be implemented based on objects and object-oriented classes. For example, terms and components of the smart contract can be represented as objects that are handled by applications implementing the smart contracts. A smart contract (or an object in the smart contract) can call another smart contract (or an object in the same smart contract) just like other object-oriented objects. Calls that are made by an object can be, for example, a call to create, update, delete, propagate, or communicate with objects of another class. Calls between objects can be implemented as functions, methods, application programming interfaces (APIs), or other calling mechanisms. For example, a first object can call a function to create a second object.

Figure 1:
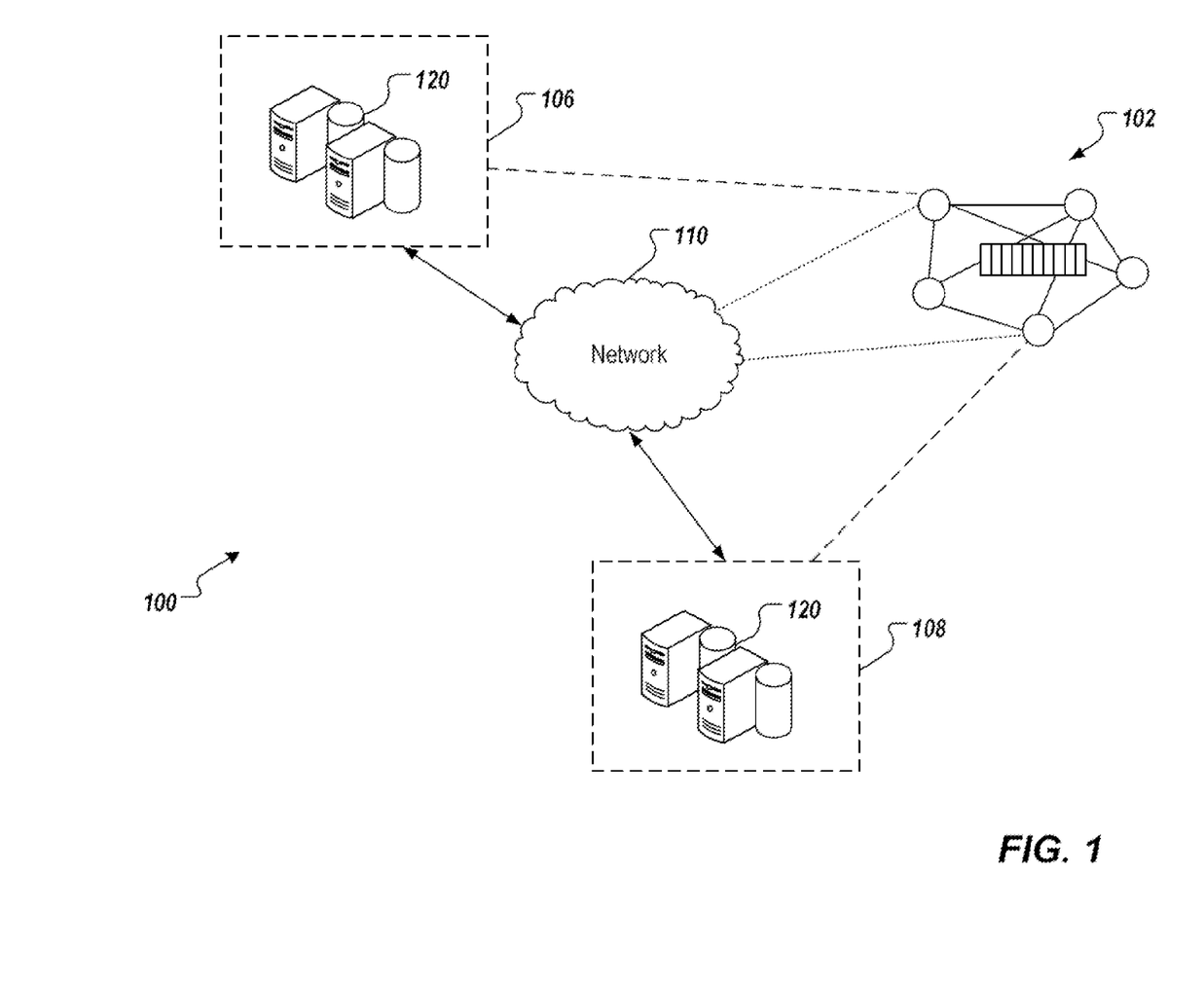
FIG. 1 depicts an example environment that can be used to execute implementations of the present disclosure.

FIG. 1 depicts an example environment 100 that can be used to execute implementations of the present disclosure. In some examples, the example environment 100 enables entities to participate in a consortium blockchain network 102. The example environment 100 includes computing systems 106, 108, and a network 110. In some examples, the network 110 includes a local area network (LAN), a wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity and the second entity, respectively, which participate in the consortium blockchain network 102.

Figure 2:
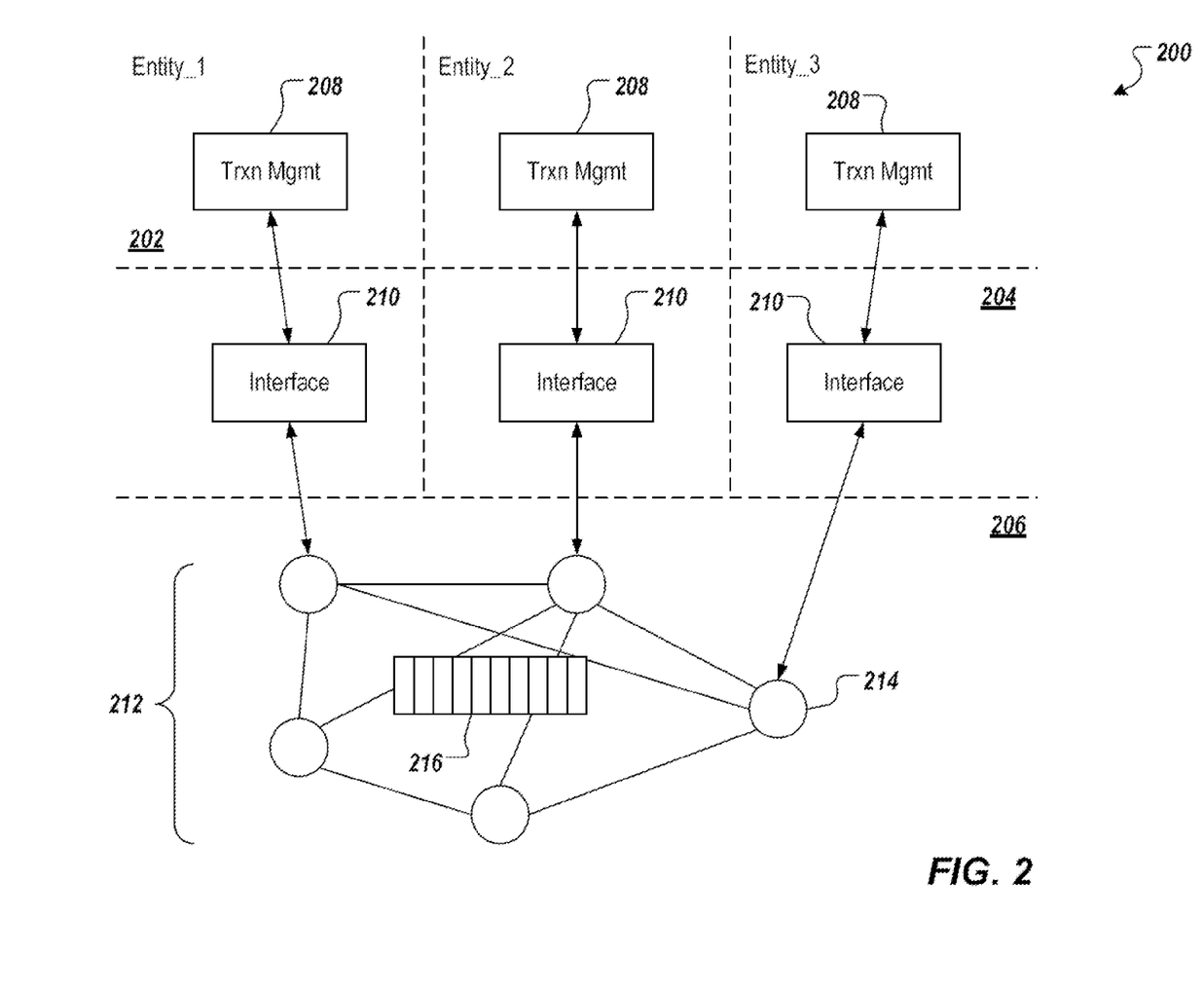
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicates with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216 (e.g., a consortium blockchain). Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the private blockchain network.

Figure 3:
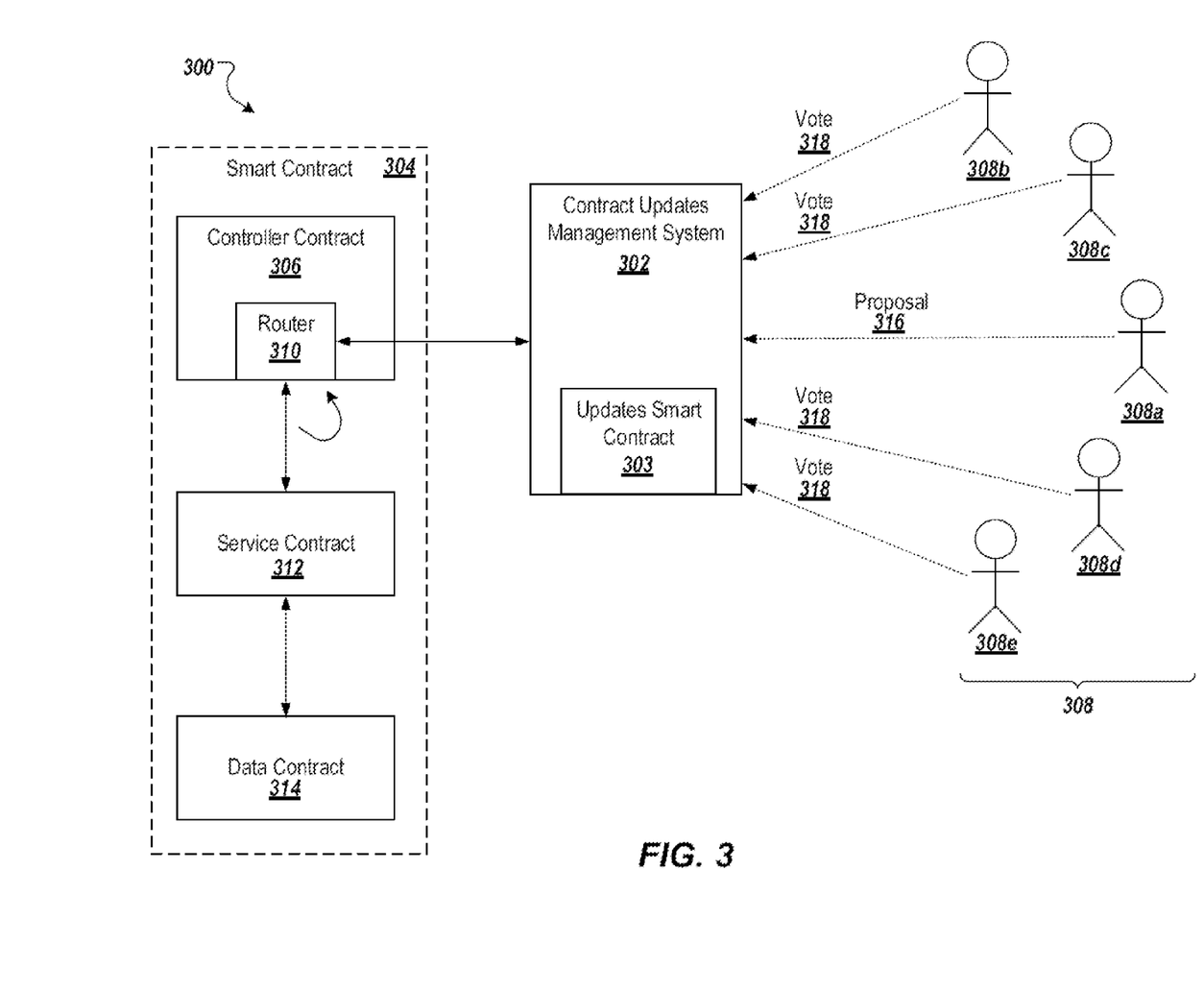
FIG. 3 depicts an example system for updating smart contracts in accordance with implementations of the present disclosure.

FIG. 3 depicts an example system 300 for updating smart contracts in accordance with implementations of the present disclosure. In the depicted example, the system 300 includes a contract updates management system 302 that manages updates to smart contracts, including a smart contract 304. Although a single smart contract 304 is depicted, it is contemplated that the contract updates management system 302 can be used to update any number of smart contracts 304 within a consortium blockchain network, for example. Further, although a single updates smart contract 303 is depicted, it is contemplated that any number of updates smart contracts 303 can be provided. In some examples, an updates smart contract 303 is provided for one or more smart contracts 304 (e.g., a one-to-many relationship). In some examples, an updates smart contract 303 is provided for a single smart contract 304 (e.g., a one-to-one relationship). In some examples multiple updates smart contracts 303 are provided for a single smart contract 304 (e.g., many-to-one relationship).

In accordance with implementations of the present disclosure, the contract updates management system 302 selectively executes an updates smart contract 303 to update the smart contract 304. Although schematically depicted within the contracts updates management system 302, the updates smart contract 303 generally resides, and is executed within the consortium blockchain network. In some examples, and as described in further detail herein, the updates smart contract 303 includes logic for invoking an update to the smart contract 304, one or more conditions required for the update to be executed on the smart contract 304, and, assuming the one or more conditions are met, executing the updated to the smart contract 304.

In further detail, the contracts management system 302 can invoke an update process. For example, and as described in further detail herein, an update request can be provided to the contracts management system 302, which invokes the update process. In some examples, the update request identifies the smart contract 304 that is to be updated, as well as an update that is to be performed. In some examples, the smart contract 304 is identified based on a unique address of the smart contract 304 within the consortium blockchain network (e.g., 39a1509440f8c549dfd6e995def14b1ce3c98e5d). For example, after, or with creation of the smart contract 304, the smart contract 304 can be registered with the contract updates management system 302. In some examples, registration of the smart contract 304 includes indexing the smart contract 304 based on its unique identifier, and referencing one or more updates smart contracts 303 that are to be executed for updating the smart contract 304. In some examples, each of the one or more updates smart contracts 303 is referenced based on a unique address of the respective updates smart contract 303 within the consortium blockchain network (e.g., 23d61f4a88f90be1290c0eeab344992e1a2e8f6d).

In some implementations, the update request can include a type of update that is to be performed to the smart contract 304. In some examples, an updates smart contract 303 can be selected for executing the update process based on the type of update. For example, for a first type of update (e.g., modifying prices), a first updates smart contract is selected, and includes a first set of conditions, and for a second type of update (e.g., modifying parties to the smart contract), a second updates smart contract is selected, and includes a second set of conditions. In some examples, sets of conditions between updates smart contracts can be more/less stringent. For example, the first set of conditions can be less stringent than the second set of smart contracts.

In some implementations, an updates smart contract 303 is selected regardless of the type of update (e.g., a single updates smart contract 303 is associated with the smart contract 304). In some examples, a set of conditions implemented by the updates smart contract is selected based on the type of update. For example, for the first type of update, the updates smart contract 304 implements the first set of conditions, and for the second type of update, the updates smart contract 304 implements the second set of conditions.

In some implementations, the updates smart contract 303 can manage a list of nodes 308 that are involved in satisfying the one or more conditions that are to be met for updating of the smart contract 304. In some examples, a node 308 performs some task, or has some task performed (e.g., by a user at the node 308). For example, a node 308 can be required to provide information, approval, a signature (e.g., digital signature), and/or a vote, depending on the logic and set of conditions required to implement the update.

A non-limiting example for approving an update is described in further detail herein with reference to FIG. 3. In the example of FIG. 3, the nodes 308 (depicted as users) vote on a proposed update to the smart contract 304. Example types of voting can include, without limitation, committee members and attribute change voting, and contract escalation voting. Committee members and attribute change voting can be used to update the voting member list, and corresponding voting parameters. Contract escalation voting can be used to update the smart contract 304.

Each proposal to update the smart contract 304 that is processed by the contract updates management system 302 can include the content. Example content can include, without limitation, an address of the smart contract 304, an address of the updates smart contract 303, a reason for the update (or upgrade), and/or a list of new committee members. Conditions for the proposal can include, for example, information specifying whether full consent is required for the proposal to be accepted, whether a required weight ratio is established for accepting the proposal, and whether vetoes are enabled (and how a veto option is to be applied). A proposal voting deadline and a proposal effective time interval can identify a timing from the generation of the proposal to the execution of the proposal (during a voting process). Example types of votes can include, without limitation, an attribute change vote, and a contract update vote.

A controller contract 306 can be defined by a dispatcher upon receipt of a request by a contract originator who originates the smart contract 304. For example, the smart contract 304 can be originated by one or more of the nodes 308. In the depicted example, the controller contract 306 includes a router 310 that routes requests, including requests to update the smart contract 304. The smart contract 304 also includes a service contract 312, and a data contract 314. The service contract 312 can include business logic of the smart contract 304. The data contract 314 can include terms of the smart contract 304, including products, and/or services covered by the smart contract 304 and payment information for the contract for receipt of the products, and/or services.

In some examples, the router 310 is responsible for routing requests and other information to the correct service contract address, for example, the correct one of the nodes 308. A modification of the contract address data in the router 310 can be performed by the updates smart contract 303. A decision to update the smart contract 304 can be formed by the members of the consortium, a contract management committee, or a joint vote by a number of the nodes 308.

In an example sequence of events, a node 308a can propose a change to the smart contract 304. The proposed change can be in the form of a proposal 312 (e.g., an update request), for example, that changes the terms of the smart contract 304 (e.g., a delivery date, a price to be paid for a product or service). The contract updates management system 302 can receive the proposal 312, and can send requests to non-change-proposing users 308 (including users 308b, 308c, 308d, 308e). The requests that are sent to the non-change-proposing users 308 can include the change being proposed for the smart contract 304, and a request (or invitation) to vote on the change. The nodes 308b, 308c, 308d, 308e can provide their votes 318 to the contract updates management system 302, which can then determine whether or not to approve the change. In some examples, a vote is automatically provided by a node (e.g., computer-execution of the vote). In some examples, a vote is provided by a user through the node (e.g., an authorized user submits a vote through the node).

Figure 4:
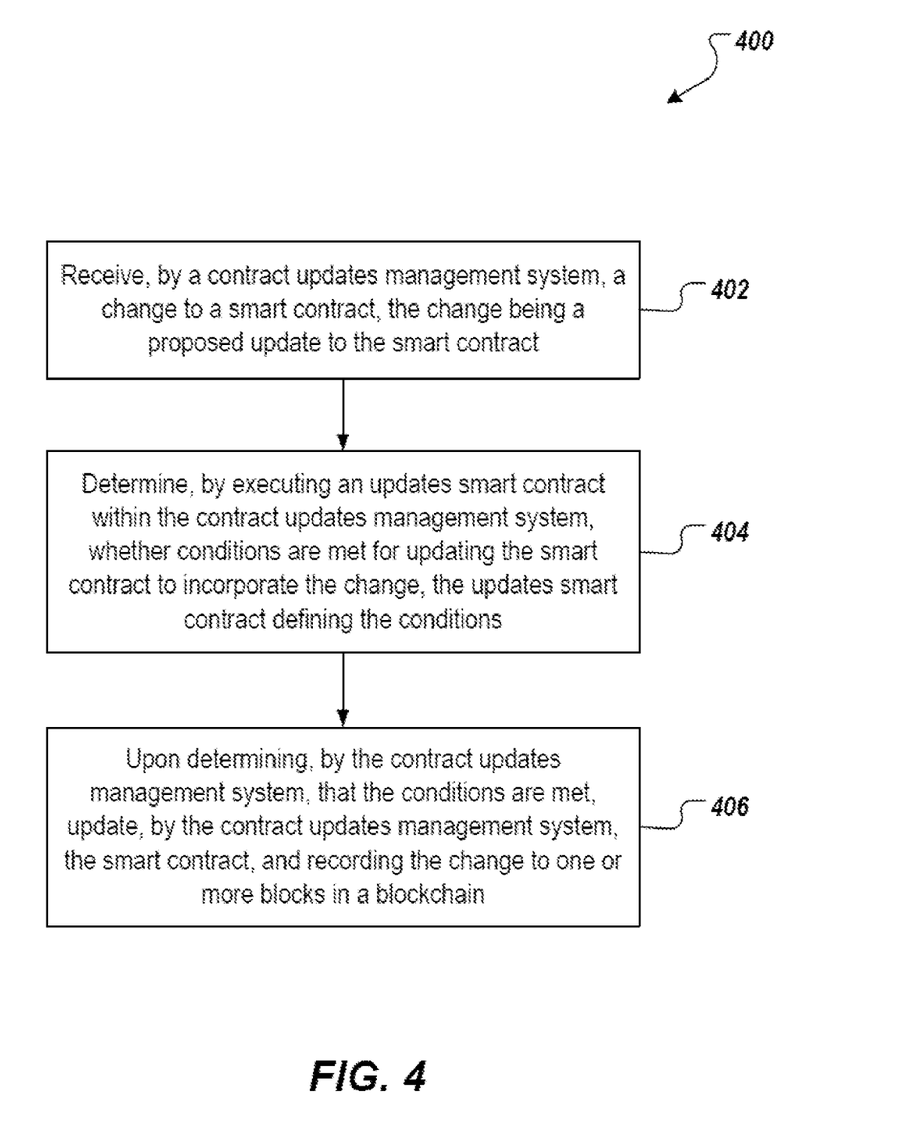
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices.

At 402, a change to a smart contract is received by a contract updates management system. For example, a change to the smart contract 304 can be proposed by the user 308a. The change can be a proposed update, for example, to change contract terms of the smart contract 304. The contract terms proposed to be changed can include, for example, a change to a delivery date or a price to be paid for a product or service identified in the smart contract 304.

At 404, a determination is made whether conditions are met for updating the smart contract to incorporate the change. For example, the determination can be made by executing the updates smart contract 303 within the contract updates management system 302. The updates smart contract 303 can define the conditions for making the determination.

In some implementations, determining whether the conditions are met includes performing a voting process including the following. The proposed change is sent to the blocks in the blockchain with a request for a vote for or against the change. For example, the contract updates management system 302 can send requests to the blocks representing the users 308b, 308b, 308d, and 308e. The contract updates management system 302 can then collect the votes 318 from the blocks in the blockchain. The contract updates management system 302 can then determine that conditions are met, for example, when the collected votes indicate an approval of the change by a consensus of the blocks in the block chain.

In some implementations, the voting process includes weighting votes by weights associated with specific voters, and the consensus can be based on a function of the collected votes and their associated weights. For example, some of the users 308 can be contract parties whose importance to the smart contract 304 varies by their importance. During the voting process, the contract updates management system 302 use weights associated with the different users 308 to make a decision whether a consensus of the voters has been reached.

In some implementations, performing the voting process includes applying a veto received from a veto-privileged voter. The voting process can terminate when a veto is received for the change during the voting process, with the veto causing the change to be rejected. For example, some of the users 308 can be contract parties of the smart contract 304 who are either a buyer or seller. These types of contract parties can have veto privileges to any proposed changes to the smart contract 304.

In some implementations, performing the voting process includes using voting rules specifying when the voting process is to result in approval of the change or rejection of the change. As an example, a set of voting rules for a given smart contract can include rules that specify how voting is to be used to determine if an approval is made. The rules can specify, for example, a minimum number of blocks in the blockchain that are needed for approval, or some other combination of voting. Each smart contract can have a unique set of voting rules.

In some implementations, performing the voting process includes using a voting start time and a voting end time that define a voting period in which the voting process occurs. For example, the updates smart contract 303 can define a length of time (for example, a number of hours or days) that can be mapped to a specific start time and end time.

In some implementations, performing the voting process ends and the conditions are met when a threshold number of voters have approved the change or when a combination of one or more specific voters have approved the change. For example, the contract updates management system 302 can determine, using voting rules, that a consensus has been reached when at least three of the users 308 have voted to approve the proposed change.

At 406, upon determining, by the contract updates management system, that the conditions are met, the smart contract is updated by the contract updates management system. The change is recorded to one or more blocks in a blockchain. For example, the contract updates management system 302 can propagate the change to blocks in the blockchain (for example, the users 308).

Although an example update process is described herein with reference to voting on a proposed update, it is contemplated that implementations of the present disclosure can be realized using any appropriate conditions for allowing, or disallowing an update. For example, in response to an update request, example conditions can include requiring approval of the update from one or more specified users. If each of the one or more specified users gives their approval, the update is executed to the smart contract. If any of the one or more specified users fails to give their approval, the update is not executed to the smart contract. As another example, example update conditions can include requiring disapproval of an update from one or more specified users within a predefined period of time. If disapproval is not received within the predefined period of time, the update is executed. As still another example, example update conditions can include requiring approval of an update from one or more specified users within a predefined period of time. If approval is not received within the predefined period of time, the update is rejected.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing updates to smart contracts executed in blockchain networks, the method comprising:
   receiving, from a user, at a contract updates management system, an update request indicating a change in terms of a first smart contract, the change in terms being a proposed update to the first smart contract;
   in response to executing a different second smart contract within a blockchain network:
      determining, by the contract updates management system, whether conditions are met for updating the first smart contract to incorporate the change in terms, the second smart contract defining the conditions; and
   upon determining, by the contract updates management system, that the conditions are met, updating, by the contract updates management system, the first smart contract, and recording the change in terms of the first smart contract to one or more blocks in a blockchain of the blockchain network.

2. The method of claim 1, wherein the update request comprises an identifier assigned to the first smart contract within the blockchain network.

3. The method of claim 1, wherein the update request comprises an identifier assigned to the second smart contract within the blockchain network.

4. The method of claim 1, wherein the first smart contract comprises:
   a controller contract defined by a dispatcher upon receipt of a request by a contract originator who originates the first smart contract;
   a service contract that includes logic of the first smart contract; and
   a data contract that includes terms of the first smart contract.

5. The method of claim 1, wherein determining whether the conditions are met includes performing a voting process comprising:
   sending a request to one or more nodes in the blockchain network for a vote relative to the change in terms;
   collecting votes from the one or more nodes; and
   determining that conditions are met when the collected votes indicate an approval of the change in terms by the one or more nodes.

6. The method of claim 5, wherein performing the voting process includes weighting votes by weights associated with respective nodes, and wherein approval is based on a function of the collected votes and their associated weights.

7. The method of claim 5, wherein performing the voting process includes applying a veto received from a veto-privileged node, wherein the voting process ends when a veto is received for the change in terms during the voting process, the veto causing the change in terms to be rejected.

8. The method of claim 5, wherein performing the voting process includes using voting rules specifying when the voting process is to result in approval of the change in terms or rejection of the change in terms.

9. The method of claim 5, wherein performing the voting process includes using a voting start time and a voting end time that define a voting period in which the voting process occurs.

10. The method of claim 5, wherein performing the voting process ends and the conditions are met when a threshold number of voters have approved the change in terms or when a combination of one or more specific voters have approved the change in terms.

11. A non-transitory computer-readable storage medium coupled to one or more processors and having instructions stored thereon which, when executed by the one or more processors, cause the one or more processors to perform operations for managing updates to smart contracts executed in blockchain networks, the operations comprising:
   receiving, from a user, at a contract updates management system, an update request indicating a change in terms of a first smart contract, the change in terms being a proposed update to the first smart contract;

in response to executing a different second smart contract within a blockchain network:
 determining, by the contract updates management system, whether conditions are met for updating the first smart contract to incorporate the change in terms, the second smart contract defining the conditions; and
 upon determining, by the contract updates management system, that the conditions are met, updating, by the contract updates management system, the first smart contract, and recording the change in terms of the first contract to one or more blocks in a blockchain of the blockchain network.

12. The computer-readable storage medium of claim 11, wherein the update request comprises an identifier assigned to the first smart contract within the blockchain network.

13. The computer-readable storage medium of claim 11, wherein the update request comprises an identifier assigned to the second smart contract within the blockchain network.

14. The computer-readable storage medium of claim 11, wherein the first smart contract comprises:
 a controller contract defined by a dispatcher upon receipt of a request by a contract originator who originates the first smart contract;
 a service contract that includes logic of the first smart contract; and
 a data contract that includes terms of the first smart contract.

15. The computer-readable storage medium of claim 11, wherein determining whether the conditions are met includes performing a voting process comprising:
 sending a request to one or more nodes in the blockchain network for a vote relative to the change in terms;
 collecting votes from the one or more nodes; and
 determining that conditions are met when the collected votes indicate an approval of the change in terms by the one or more nodes.

16. The computer-readable storage medium of claim 15, wherein performing the voting process includes weighting votes by weights associated with respective nodes, and wherein approval is based on a function of the collected votes and their associated weights.

17. The computer-readable storage medium of claim 15, wherein performing the voting process includes applying a veto received from a veto-privileged node, wherein the voting process ends when a veto is received for the change in terms during the voting process, the veto causing the change in terms to be rejected.

18. The computer-readable storage medium of claim 15, wherein performing the voting process includes using voting rules specifying when the voting process is to result in approval of the change in terms or rejection of the change in terms.

19. The computer-readable storage medium of claim 15, wherein performing the voting process includes using a voting start time and a voting end time that define a voting period in which the voting process occurs.

20. A system, comprising:
 a computing device; and
 a computer-readable storage device coupled to the computing device and having instructions stored thereon which, when executed by the computing device, cause the computing device to perform operations for managing updates to smart contracts executed in blockchain networks, the operations comprising:
  receiving, from a user, at a contract updates management system, an update request indicating a change in terms of a first smart contract, the change in terms being a proposed update to the first smart contract;
 in response to executing a second smart contract within a blockchain network, wherein the second smart contract is different than the first smart contract:
  determining, by the contract updates management system, whether conditions are met for updating the first smart contract to incorporate the change in terms, the second smart contract defining the conditions; and
 upon determining, by the contract updates management system, that the conditions are met, updating, by the contract updates management system, the first smart contract, and recording the change in terms of the first contract to one or more blocks in a blockchain of the blockchain network.

* * * * *